United States Patent [19]

Pearson

[11] Patent Number: 4,639,259

[45] Date of Patent: Jan. 27, 1987

[54] PROMOTED SCAVENGER FOR PURIFYING HCL-CONTAMINATED GASES

[75] Inventor: Michael J. Pearson, Pleasanton, Calif.

[73] Assignee: Kaiser Aluminum & Chemical Corporation, Oakland, Calif.

[21] Appl. No.: 785,706

[22] Filed: Oct. 9, 1985

[51] Int. Cl.$^4$ ............................................. B01D 53/04
[52] U.S. Cl. ........................................... 55/71; 55/74; 423/248
[58] Field of Search ................. 55/71, 74; 423/240 S, 423/248, 628; 502/340, 414, 415

[56] References Cited

U.S. PATENT DOCUMENTS

| | | | |
|---|---|---|---|
| 3,222,129 | 12/1965 | Osment et al. | 502/415 X |
| 3,226,191 | 12/1965 | Osment et al. | 502/415 X |
| 3,434,479 | 3/1969 | Till et al. | 502/415 X |
| 3,725,531 | 4/1973 | Pearson et al. | 423/244 |
| 3,760,565 | 9/1973 | Fish | 423/240 S X |
| 3,853,789 | 12/1974 | Warthen et al. | 502/415 |
| 3,933,978 | 1/1976 | Margraf | 55/71 X |
| 3,943,226 | 3/1976 | Difford | 423/230 |
| 3,997,652 | 12/1976 | Teller | 423/240 S X |
| 4,045,371 | 8/1977 | Wheelock et al. | 502/415 X |
| 4,053,558 | 10/1977 | Campbell | 55/71 X |
| 4,493,715 | 1/1985 | Hogan et al. | 55/74 X |
| 4,571,445 | 2/1986 | Slaugh | 502/415 X |

FOREIGN PATENT DOCUMENTS

| | | | |
|---|---|---|---|
| 125644 | 11/1984 | European Pat. Off. | 502/415 |
| 2205354 | 5/1974 | France | 423/240 S |
| 35055 | 4/1975 | Japan | 423/240 S |
| 30172 | 3/1976 | Japan | 423/240 S |

Primary Examiner—Robert Spitzer
Attorney, Agent, or Firm—Andrew E. Barlay

[57] ABSTRACT

HCl-contaminated gas streams are purified by contacting the contaminated gas with an alumina-containing material which has been promoted with an alkaline earth metal salt.

8 Claims, No Drawings

PROMOTED SCAVENGER FOR PURIFYING HCL-CONTAMINATED GASES

BACKGROUND OF THE INVENTION

In many chemical processes small quantities of gaseous HCl are generated as an impurity. For example, in the production of high octane fuels by catalytic reforming of low octane gasoline fractions, a chlorine-promoted catalyst, generally platinum, is employed and during the reforming operation a portion of the chlorine content is converted to HCl. The reforming operation also generates hydrogen which is usually recycled to the reforming reactor and if this recycled portion, containing the HCl impurity even in small amounts, is recycled it can seriously interfere with the operation and also cause corrosion upon contact with the moisture content of the gas. In other vapor-phase chemical operations, where a metal chloride, such as $AlCl_3$ or $FeCl_3$, is used as a catalyst, the formation of HCl as an impurity becomes possible and removal of this impurity is required in order to avoid corrosion of the process equipment or environmental problems resulting from the release of the HCl-containing gas to the atmosphere.

In the past active alumina was found to be suitable as a scavenger for the removal of small quantities of HCl from gaseous streams. Stricter environmental demands and more precise operations in the chemical processing and petroleum refining industries however require more efficient HCl scavengers. It has now been found that these demands can be readily met by using as HCl scavenger bauxite or alumina subjected to thermal activation and promoted with an alkaline earth metal salt, for example, a calcium salt. The alkaline earth metal salt promoted aluminous material of the present invention exhibits a significantly higher HCl scavenging property than the prior art scavengers and simultaneously exhibits an increased stability in the presence of moisture under the scavenging conditions generally employed.

SUMMARY OF THE INVENTION

An alkaline earth metal salt promoted alumina-containing scavenger is provided for the removal of HCl contaminant from industrial gases containing the same. The promoted, alumina-containing HCl scavenger, such as activated bauxite or alumina can contain up to about 45% by weight alkaline earth metal salt calculated as the metal. The promoted HCl scavenger having a minimum surface area of about 50 $m^2/g$ can remove up to about 20% by weight Cl (depending on its alkaline earth metal content) from gas streams contaminated with up to about 1% by volume HCl. Preferred alkaline earth metals are calcium and magnesium which can be added to the bauxite or alumina in a conventional manner, such as impregnation. Shaped, promoted scavenger can also be made by admixing the desired quantity of promoter with the bauxite or alumina, followed by shaping, for example, nodulization or extrusion and subsequent thermal activation.

DETAILED DESCRIPTION OF THE INVENTION

This invention relates to the removal of HCl impurity from industrial gases containing the same. In particular, the invention concerns the removal of HCl impurities from industrial gases by contacting the contaminated gas with an alkaline earth metal promoted alumina-containing material such as bauxite or alumina.

For the purposes of this invention the term "alumina-containing material" refers to both bauxite and to alumina ($Al_2O_3.xH_2O$) derived from bauxite or other alumina bearing source, such as beneficiated clays.

The terms "alkaline earth metal" or "promoter" as used herein refer to the metals of Group IIA of the periodic chart of the elements, the preferred alkaline earth metals being calcium and magnesium.

Suitable alumina-containing materials which can be advantageously employed for the promoted scavenger include both bauxite and $Al_2O_3.xH_2O$ provided these materials meet certain criteria. Thus, when bauxite is utilized for the preparation of the scavenger of the present invention, the bauxite should have a minimum alumina ($Al_2O_3$) content of about 40% by weight, calculated on the basis of its dry weight; i.e. after ignition at 1000° C. for 1 hour. The silica ($SiO_2$) content of the bauxite should not exceed 15% by weight on the dry basis. Suitable bauxites include those mined in the Caribbean, South America, Australia and Western Africa.

When alumina is utilized for the preparation of the promoted scavenger, the alumina employed can be derived from alumina trihydrate ($Al_2O_3.3H_2O$) manufactured by the well-known Bayer process or it can be a gel-type alumina made by the neutralization of a basic aluminum salt with an acid or an acidic aluminum salt with a base. Typical aluminas, suitable for being used as the base material for the promoted scavenger include without limitation alumina trihydrate, pseudoboehmite, alpha alumina monohydrate and other well-known thermally activated aluminas exhibiting gamma, chi-rho-eta, delta or kappa structures.

Regardless, whether the scavenger is based on bauxite or on alumina, the promoted scavenger, after thermal activation, should exhibit a minimal surface area of 50 $m^2$/gram, preferably a surface area in excess of about 100 $m^2/g$. The promoted scavenger should have a minimum pore volume, also after thermal activation, of at least about 0.3 $cm^3/g$, preferably in the range from about 0.4 to about 0.6 $cm^3/g$.

As mentioned above, the promoter for the HCl scavenger is an alkaline earth metal selected from Group IIA of the periodic chart of elements. The alkaline earth metals suitable for being employed as promoters for HCl scavenging include calcium, strontium, magnesium and barium, calcium and magnesium being the preferred metals.

Incorporation of the promoter in the alumina-containing material can be accomplished in the conventional manner, for example by impregnation or by admixture of the promoter with the alumina-containing material followed by shaping. In the event impregnation is employed as the means for promoting the scavenging capabilities of the alumina-containing material, then the alkaline earth metal utilized in generally employed in the form of a water-soluble salt. Suitable alkaline earth metal salts which lend themselves for impregnation from an aqueous solution include the hydroxides, nitrates, chlorides, acetates, and salts of other organic acids, those salts being preferred which can be readily decomposed to the corresponding oxides at relatively low temperature thermal activation without generating environmentally harmful offgases. The aqueous alkaline earth metal salt solution can be applied for the impregnation of shaped alumina-containing material, or if desired the alumina-containing material can be in granular form and after impregnation the material can be subsequently shaped. Alternatively, the promoter can be admixed in dry form with the alumina-containing material followed by shaping into any desired form by the well-known shaping processes. Also the promoter and the alumina-containing material can be conodulized to form HCl scavenging nodules.

The quantity of promoter to be added to the alumina-containing material can vary from about 0.5% to about 45% by weight, based on the alkaline earth metal content of the promoted scavenger. Particularly good HCl scavenging results can be achieved when the promoter is present in the composite in an amount from about 1% to about 20% by weight, calculated as the metal and based on the weight of the composite.

For the preparation of the promoted scavenger, after the promoter and the alumina-containing material are combined a thermal activation step is generally utilized. The thermal treatment is required particularly when the alumina-containing material utilized for the promoted scavenger is a bauxite in the unactivated state or an alumina of high bound and unbound water content, such as Bayer hydrate ($Al_2O_3.3H_2O$) or gel alumina. Even if the alumina-containing material used for making the scavenger composition is a previously activated alumina or bauxite, impregnation with an aqueous promoter solution or shaping in the presence of water makes it necessary to subject the promoted scavenger to a thermal treatment step. The thermal treatment or activation step not only imparts increased activity to the scavenger, but also accomplishes the thermal decomposition of the alkaline earth metal salt to the corresponding oxides. Suitably, temperatures in the range from about 150° C. to about 500° C. are utilized, depending on the decomposition temperature of the alkaline earth metal salts employed and the nature of the alumina-containing material used for the scavenger.

The thermally treated or activated scavenger can be readily employed in the removal of HCl impurities from industrial offgases. Generally, removal is accomplished by providing an adsorber vessel charged with the scavenger and the HCl contaminated gases are conducted through the adsorber either in a down or in an upflow manner. The exit gas will be free of HCl which will be removed by the scavenger of the instant invention. It has been observed that the best scavenging activity can be achieved by treating gas streams containing up to about 1% by volume HCl impurity. Larger quantities of HCl impurity in the gas streams may cause premature saturation of the promoted scavenger with the possibility of having an undesired early break-through and consequent corrosion and environmental problems. It has been found that the promoted scavenger of the invention is effective in removing HCl from gas streams containing the same as impurity in amounts less than 1.0% by volume to levels of less than 1 ppm by weight thus providing an offgas of significantly reduced HCl content. Further, it has also been found that if the HCl contamination of the gas is in the range from about 2 to about 4 ppm, the scavenger is still capable of reducing this very small HCl concentration to levels below the 1 ppm limit.

In the past moisture-containing gases contaminated with HCl were difficult to purify due to the competing adsorption tendency of the moisture and the HCl on the alumina scavenger surface. The instant promoted scavenger was found to perform in an effective manner in the presence of water vapor due to its stability imported by the promoter.

Small quantities of water vapor in the contaminated gas will not interfere with the HCl scavenging ability of the promoted scavenger, as a matter of fact it is preferred to have water vapor in the range of 1-2 times the HCl concentration in the gas to be purified.

Purification of HCl contaminated gas streams with the promoted scavenger is generally continued until the gas exiting from the purifying column is observed to have an HCl content above the desired level. At this stage the gas to be purified is conducted into a column filled with fresh promoted scavenger and the scavenger saturated with HCl is either discarded or employed for other purposes. For example, the HCl contaminated scavenger can be subjected to a purification process involving dissolution of the alumina content and the recovery of the same.

In the following examples further details of the invention will be illustrated.

EXAMPLE 1

Active, transitional alumina nodules, having a chi-rho-eta crystal structure, were used as the alumina-containing material for the promoted scavenger. The transitional alumina nodules were prepared from alumina trihydrate by the method described in U.S. Pat. No. 3,222,129. Batches of these nodules, exhibiting a surface area of 360 $m^2/g$ and a pore volume of 0.48 $cm^3/g$, were then combined with Ca, Mg and Ba promoters by the impregnation method using the water-soluble acetate salts of these alkaline earth metals. Impregnation was followed by drying at 110° C. and subsequent thermal treatment at 400° C. for 2 hours. Each impregnated batch of promoted scavengers was then tested for HCl adsorption capacity by charging separate adsorption columns with each type of promoted scavenger and using an HCl-contaminated reforming gas for purification purposes. The gas, such as used in the catalytic reforming of hydrocarbons, contained 0.1% by volume HCl and 1000 ppmv water vapor. Purification of the gas was carried out at room temperature until the breakthrough point which was established as 1 ppm HCl in the purified gas. The chloride content of the exhausted scavenger was then analytically determined. For comparison purposes a column filled with unimpregnated transitional alumina nodules was also used for HCl removal from the same type of gas as used for testing the promoted scavengers. The results were tabulated and are shown in Table I.

TABLE I

| Removal of HCl from Contaminated Gases with Promoted Scavengers | | |
|---|---|---|
| Promoter Type | Promoter % by weight (as metal) in the scavenger | HCl uptake by scavenger in % by weight Cl |
| Ca | 1.2 | 13.0 |
| Ca | 2.8 | 13.8 |
| Mg | 1.0 | 13.3 |
| Mg | 2.5 | 13.5 |
| Ba | 1.3 | 9.4 |
| Ba | 3.2 | 9.9 |
| None | 0 | 8.0 |

EXAMPLE 2

In this example bauxite was utilized as the alumina-containing portion of the promoted scavenger. The bauxite utilized had a composition shown in Table II. The bauxite was dried at 110° C., then ground to a suitable particle size. The ground bauxite was then admixed with an aqueous suspension of Ca(OH)$_2$ and the mixture was formed into adobe shapes by pressing. The adobes were dried at about 110° C. for 1 hour, then subjected to thermal activation for about 1 hour at 400° C. The shaped and activated calcium-promoted bauxite scavenger was then charged into a column and HCl-contaminated gas was conducted through the column until break-through was observed by analyzing the gas exiting the column. The HCl-contaminated gas had an HCl content of 0.2% and a moisture content of 2000 ppmv. The exit gas had a less than 1 ppm HCl content until the break-through point was reached. Purification of the gas was accomplished at ambient temperature. A control test was also conducted with the same bauxite, however no promoter was used to increase its HCl scavenging ability. The results of the scavenging tests are shown in Table III.

TABLE II

Composition of Bauxite used in Promoted Scavenger for HCl Removal from Contaminated Gas.

| Constituent | % by weight |
| --- | --- |
| Al$_2$O$_3$ | 45.0 |
| Fe$_2$O$_3$ | 22.0 |
| CaO | 1.0 |
| TiO$_2$ | 2.5 |
| SiO$_2$ | 1.0 |
| LOI* (Loss on Ignition) | 27.0 |
| Other | 1.5 |

*Loss on Ignition determined at 1000° C. for 1 hour.

TABLE III

Removal of HCl from Contaminated Gas with Promoted Bauxite-based Scavenger

| Promoter Type | Promoter % by weight (as metal) added the scavenger | HCl uptake by scavenger in % by weight Cl |
| --- | --- | --- |
| Calcium | 6.0 | 12.7 |
| None | 0 | 7.5 |

EXAMPLE 3

Scavenging tests were also conducted with transitional alumina-containing materials promoted with varying quantities of calcium. The calcium-promoted scavengers were all prepared according to the procedure described in Example 2. The promoted scavenger samples were then employed for the purification of a catalytic reforming gas stream containing 0.1% by volume HCl and 1000 ppmv moisture. In each instance the purification was carried out until the break-through point. Subsequently, the chloride content of each promoted alumina was determined. The results were tabulated and are shown in Table IV.

TABLE IV

Removal of HCl from Contaminated Gas Using Calcium-promoted Alumina Scavenger

| Calcium content of scavenger in % by weight (as metal) | HCl uptake by scavenger in % by weight Cl |
| --- | --- |
| 0 | 8.0 |
| 0.5 | 11.4 |
| 1.0 | 12.2 |
| 4.0 | 14.2 |
| 9.0 | 17.9 |
| 19.0 | 18.8 |

TABLE IV-continued

Removal of HCl from Contaminated Gas Using Calcium-promoted Alumina Scavenger

| Calcium content of scavenger in % by weight (as metal) | HCl uptake by scavenger in % by weight Cl |
| --- | --- |
| 32.4 | 19.8 |

From the results shown in Table IV it can be observed that the higher the promoter content of the scavenger, the higher its HCl removing capability. It can be also observed that significant HCl scavenging can be achieved when the promoter is present in quantities up to about 10% by weight (as metal). Selection of higher quantities, while capable of improving the scavenging potential of the promoted material, become a question of economics.

EXAMPLE 4

Scavenging tests were also conducted with a reformer gas containing a very low level of HCl. The HCl impurity content was 5 ppm and the water concentration 25 ppmv. The scavenging performance of a promoted alumina scavenger containing 6% by weight calcium and made according to the method shown in Example 2 was compared to a conventional nonpromoted alumina scavenger. Due to the low HCl concentration the breakthrough point for these scavengers was not measured, however, samples were taken from the top of the adsorber columns at 7 day intervals to establish the HCl removal levels. The results were tabulated and are shown in Table V.

TABLE V

Removal of HCl from Reformer Gas Containing 5 ppm HCl Impurity

| Time (in days) | % by weight HCl Removed | |
| --- | --- | --- |
| | Promoted Scavenger | Nonpromoted Scavenger |
| 7 | 3.0 | 2.9 |
| 14 | 4.4 | 3.2 |
| 21 | 5.9 | 3.6 |
| 28 | 7.3 | 3.9 |

The analyses shown in Table V clearly indicate the efficacy of the promoted scavenger in the removal of small quantities of HCl from contaminated gas and it also indicates the improved results which can be achieved due to the incorporation of the alkali earth metal promoter in the alumina.

What is claimed is:

1. A process for purifying industrial gases containing HCl as a contaminant which comprises contacting the gas containing up to about 1% by volume HCl in the presence of water vapor in an amount ranging from about 25 ppmv to about 2% by volume with a thermally activated alumina-containing scavenger promoted with an alkaline earth metal, the promoted scavenger containing from about 0.5 to about 45% by weight alkaline earth metal and exhibiting in the activated state a minimal surface area of about 50 m$^2$/g and a minimum pore volume of at least about 0.3 cm$^3$/g, maintaining the contact between the HCl contaminated gas the the promoted scavenger until the HCl content of the gas, after contact with the promoted scavenger, reaches a predetermined threshold HCl level discontinuing the contact and recovering the promoted scavenger containing the HCl impurity removed from the gas.

2. Process of claim 1 wherein the alumina-containing material is derived from the group consisting essentially of bauxite, alumina trihydrate, pseudoboehmite, alpha alumina monohydrate and their mixtures and is utilized for scavenging in the thermally activated state.

3. Process according to claim 1, wherein the alkali earth metal promoter is present in the promoted scavenger in an amount from about 1% by weight to about 20% by weight.

4. Process according to claim 1, wherein the alkali earth metal is calcium or magnesium.

5. Process according to claim 1, wherein the alumina-containing scavenger is thermally activated bauxite and the promoter is calcium.

6. Process according to claim 1, wherein the alumina-containing scavenger is a transitional alumina of chi-rho-eta structure and the promoter is calcium.

7. Process according to claim 6, wherein the promoter is magnesium.

8. Process according to claim 1, wherein water is present in an amount ranging from about 25 to about 2000 ppmv.

* * * * *